United States Patent

Daniluke

[15] 3,669,063
[45] June 13, 1972

[54] BUTTER SPREADER AND SUPPORT FOR EARS OF COOKED CORN

[72] Inventor: Manuel Daniluke, 434 Vienna Street, San Francisco, Calif. 94112

[22] Filed: April 5, 1971

[21] Appl. No.: 131,348

[52] U.S. Cl. .................................118/13, 118/76, 401/12
[51] Int. Cl. ..........................................................B05c 11/00
[58] Field of Search ...................118/13, 76, 77, 78; 184/98, 184/99, 122; 401/11, 12, 176

[56] References Cited

UNITED STATES PATENTS

| 251,761 | 5/1882 | Ridgway | 118/77 UX |
| 464,502 | 12/1891 | Holyland | 401/176 |
| 2,458,120 | 1/1949 | Volpini | 401/12 |
| 2,581,745 | 1/1952 | Amorino et al. | 401/12 |
| 3,396,697 | 8/1968 | Bieser | 118/76 |

Primary Examiner—Morris Kaplan
Attorney—Boyken, Mohler, Foster & Schwab

[57] ABSTRACT

A tube open at one end for receiving compacted butter and a manually actuatable plunger reciprocable within the tube for dispensing butter from said one end directly onto an ear of cooked corn upon moving the plunger toward said one end when said open end is adjacent to the ear and is moved longitudinally of the latter, said tube including finger-engageable means for holding the tube and for actuating the plunger, and for supporting the tube on its side when not in use, the plunger being a unit readily separable from a unitary tube leaving a through, substantially uniform, diameter open-ended bore to facilitate cleaning. A holder is provided for supporting the ear to be buttered on, but spaced above, a horizontal surface and for rotating the ear when so supported, and for manually holding the ear after buttering, for eating the corn.

6 Claims, 7 Drawing Figures

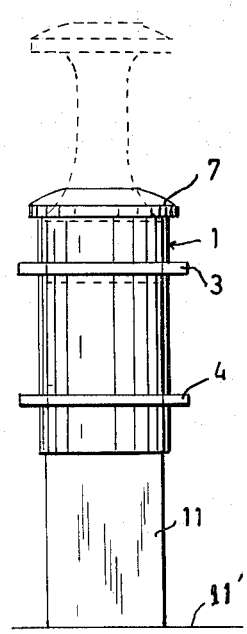
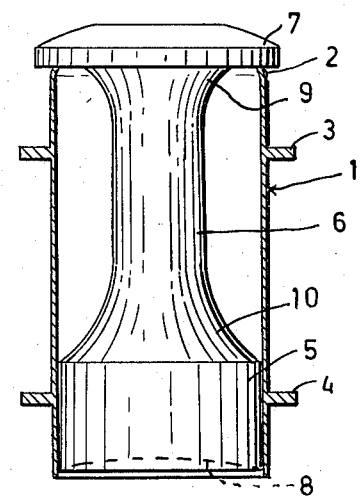
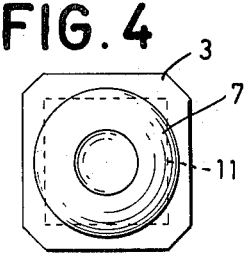
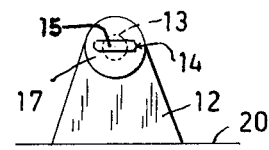
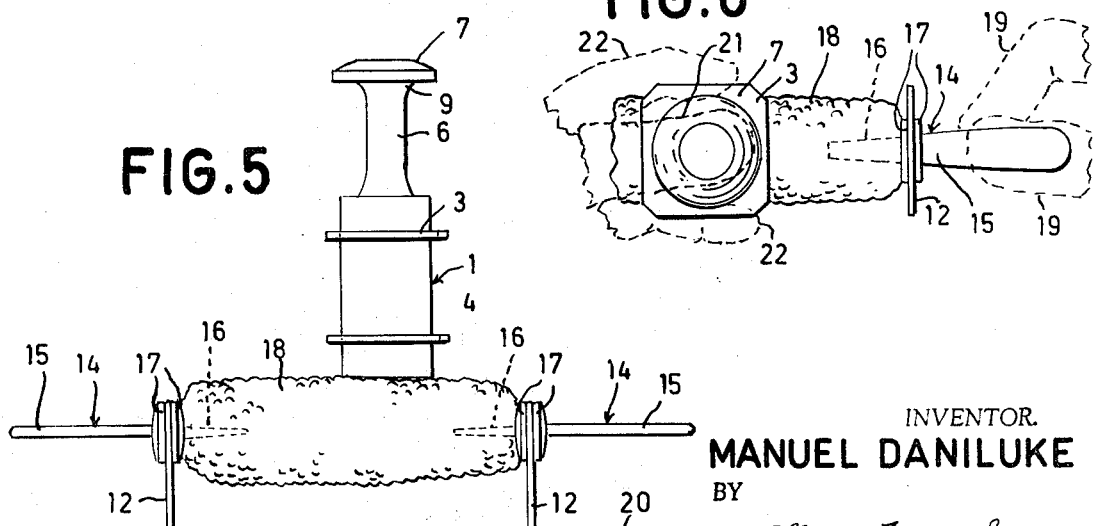
INVENTOR.
MANUEL DANILUKE
BY
Boyken, Mohler, Foster & Schwab
ATTORNEYS

BUTTER SPREADER AND SUPPORT FOR EARS OF COOKED CORN

BACKGROUND OF THE INVENTION

Heretofore, the buttering of cooked corn "on the cob" has been relatively messy, wasteful of butter, awkward, and susceptible to the occurrence of accidents. Ordinarily a knife has been used to carry a limited amount of butter to the ear and after subsequent spreading after the knife has been heated results many times in the butter sliding off the knife before it reaches the ear.

Holders secured in the ends of the ears have been used to support the hot ears during buttering, one end support being manually held by the fingers of one hand while the other hand is used for buttering, with the result that the ear, being supported at only one end frequently becomes loosened from the support and the ear falls.

SUMMARY

One of the objects of the present invention is the provision of a manually supported and manually actuatable holder and dispenser for sufficient butter to supply adequate butter for an ear of corn, and the discharge of the butter being manually controlled so as to dispense more or less butter onto the ear of corn, according to the desires of the eater.

Another object of the invention is the provision of a holder for supporting an ear of corn from both ends on a rigid surface, spaced above the latter, with means for rotating the supported ear with one hand, and a butter holder and dispenser adapted to be actuated by the other hand while the ear is so supported, which holder for the ear may then be manually lifted and manipulated while the corn is being eaten.

A still further object of the invention is the provision of a manually supported and manually actuatable holder and dispenser for sufficient butter for an ear of corn, and which holder is economical to make and easy to load and to use by any person, and is free from threads, and re-entrant portions where butter may accumulate and be difficult to remove.

An additional object is the provision of a butter holder and dispenser for applying butter to a hot ear of corn, which dispenser is cylindrical and in two readily separable parts for cleaning, there being an inner plunger and an outer tube within which the plunger is reciprocable and from which it is readily removable leaving the outer cylinder an open-ended tube. This tube includes finger-engageable means for engagement by the finger of a hand while the thumb may actuate the plunger to dispense the butter, and which means also functions to support the holder and dispenser on its side to prevent rolling.

Other objects and advantages will appear in the description and drawings.

DESCRIPTION OF DRAWINGS

FIG. 1 is a side-elevational view, partly in cross section, of the butter dispenser in collapsed position, the plunger being shown in full line.

FIG. 2 is a bottom plan view of the dispenser of FIG. 1.

FIG. 3 is a reduced size side-elevational view of the butter dispenser of FIG. 1 in position over an upended section of a standard cube of butter preparatory to loading the dispenser, the plunger being shown in broken lines when the dispenser is filled.

FIG. 4 is a top plan view of the dispenser shown in FIG. 3, the butter being shown in broken lines.

FIG. 5 is a reduced side-elevational view showing an ear of corn supported between a pair of holders that, in turn, are supported on a horizontal rigid surface for turning the holder at one end of the ear by turning one of the corn impaling members by the fingers of one hand while the butter dispenser is held and manipulated by the fingers of the other hand.

FIG. 6 is a top plan view of the butter dispenser of FIG. 5 in position over a portion of the ear of corn, and in broken lines several of the fingers of the left hand are shown in a position for supporting and manipulating the butter dispenser, and several fingers of the right hand are indicated in a position for rotating the ear.

FIG. 7 is an end view of the holder only for an ear of corn.

DESCRIPTION OF THE DISCLOSURE

The butter dispenser and holder comprises an open-ended cylinder generally designated 1 (FIG. 1) of uniform inside diameter, except that the end portion 2 may be very slightly less for a purpose later described. The diameter of the cylinder may be approximately 1½ inches in diameter, or substantially equal to the width of one side of a conventional quarter pound, elongated cube of butter (FIG. 2). The end portion 2 is the inner end and the opposite end is the outer or discharge and filling end. This cylinder forms the main body of the butter holder and dispenser.

Radially outwardly projecting flanges 3, 4 (FIGS. 1, 2) are respectively adjacent to, but spaced from, the opposite ends of the cylinder or body 1, and are rigid with the cylinder. Said flanges are formed with at least one of their edges straight and in axial alignment so the cylinder may be positioned on its side on a flat supporting surface with said straight edges on said surface, to support the cylinder against rolling. The outer linear contour of the flanges is preferably square, with the corners removed (FIG. 2), thus providing any one of four sides for supporting it on such surface.

Supported within cylinder 1 for reciprocation axially of the cylinder, is a cylindrical plunger designated 5 and rod 6 rigid with the plunger generally thereof, projects from the plunger toward the open outer end of the cylinder 1, and is rigid with a circular thumb-engageable head 7. Head 7 is slightly greater in diameter than the cylinder 1 so as to engage the outer end edge of the cylinder when the plunger 5 substantially reaches the inner end edges of the cylinder (FIG. 3). Preferably the end surface 8 of the plunger that faces toward the outer open end of the cylinder is slightly concave and the edges of said end surface to not quite reach the inner end edges of the cylinder when the head 7 engages the outer end edges.

The axial thickness of the plunger 5 is sufficient to support the rod 6 and head 7 substantially in axial alignment with the cylinder 1 at all times, although there may be a slight "play" of the plunger in the cylinder to insure freedom of axial movement between them, and to provide for withdrawal of the plunger from the inner end, as will be explained.

The ends of plunger rod 6 are divergently curved outwardly toward the head 7 and plunger 5, respectively, or at 9 and 10, so there are no sharp or even relatively sharp corners where any butter or impurities can collect and be held when the plunger is cleaned.

The diameter of the cylinder 1 at its outer end edge is restricted only enough to preclude accidental withdrawal of the plunger, but the plunger may be withdrawn from the outer end of the cylinder upon applying an extra axial pull on the head 7 outwardly of the cylinder, and re-entry of the plunger into the cylinder through the outer open end of the latter is readily accomplished by pushing the plunger past the restricted outer end of the cylinder.

In the filling operation, a cube of butter 11 may be cut to the desired length, and the cut portion 11 (FIG. 3) may be supported upright on a horizontal surface 11'. The cylinder 1 may be then positioned vertically over the half cube with its outer end centered over the portion 11 after which the cylinder is pushed downwardly and the cube half will progressively enter the holder pushing the plunger 5 and the rod 6 and head 7 upwardly to the broken line position 13 (FIG. 3) until the cylinder is filled.

The small amount of butter that was at the corners of the half cube 11 outwardly of the cylinder 1 and below the flange 4 and can be readily removed for future use. The flange 4 thus functions as a deflector for this butter.

The corn holder itself comprises a pair of identical separate plates 12 (FIGS. 5 – 7), which may be of substantially the out-line of an equilateral triangle to provide a straight edge adapted to be supported on a horizontal rigid support, and an apex opposite to said straight edge. The apexial portion of each plate is formed with an opening 13 (FIG. 7) through which a horizontally elongated element generally designated 14 rotatably extends so that a relatively long handle portion 15 projects from one side of the plate and a corn impaling blade 16 projects from the opposite side.

A pair of circular discs 17 are rigid on said element 18 at opposite sides of each plate 17 for supporting the elements 18 at right angles to the plates 17. The disc on the side having blade 16 will be abutted by an end of the ear of corn 18, while the disc on the handle side will function to protect the fingers 19 of a hand, grasping the handle, should they accidentally engage the disc.

When the ear of corn 18 is impaled at its ends on blades 16, the plates 17 will rotatably support the ear horizontally on, but spaced above, a rigid surface 20 (FIG. 5). The operator may then grasp one of the handles 15 (FIG. 6) by the fingers 19 of one hand and hold butter dispenser by the other hand with the thumb 21 over the head 7 and the portion of the cylinder below the flange 3 between any two of the other fingers 22 of the same hand. By applying pressure against head 7 by thumb 21, while fingers 22 engage the underside of flange 3 and the hand supports the cylinder over the ear of corn 18 (FIG. 5) the butter will be dispensed onto the outer surface of the ear and at the same time the other hand may hold the handle 15 stationary to prevent rotation of the ear, or may rotate the ear.

After the ear is buttered, both handles of the support may be grasped and the ear carried to the mouth for eating the corn.

The fingers that hold the butter dispenser and that grasp a handle are indicated in broken lines in FIG. 6, it being understood in any event the result accomplished is the supporting of the ear of corn for rotation, but in a stationary location, and rotating it or holding it against rotation by the fingers of one hand, while the substantially enclosed and supported supply of butter is manually displaced onto the upper side of the ear of corn under full control of the finger on the other hand of the operator.

The spreader itself may also be used for spreading butter or shortening of other similar texture on to any heated surfaces such as hot cakes, pans, etc., and when not in use and supported upright on a horizontal planar surface, such as on a plate in a refrigerator, the contents will be effectively enclosed for storage until required. The lower coplanar edge provides a stable support.

I claim:

1. A butter spreader and dispenser for butter and the tube comprising:
   a. an elongated tube for holding a supply of butter therein,
   b. a plunger supported within said tube for reciprocation longitudinally of the latter from one end to the opposite end,
   c. a projection rigid with said plunger projecting axially outwardly of said opposite end of said tube, said projection including a thumb-engageable head thereon for engagement by the thumb of a hand holding said tube for moving said plunger from said opposite end substantially to said open end upon application of pressure by said thumb on said head in a direction toward said opposite end for discharging butter within said tube from said opposite end,
   d. said tube terminating at said open end in a free, axially outwardly facing edge in a plane perpendicular to the axis of said tube, and the inside diameter of said tube through said open end upon positioning said outer end on a body of butter and pressing the tube axially thereof against said body to force the tube into said body,
   e. means on said tube at said opposite end engageable by said plunger when at said opposite end for resisting free movement of said plunger out of said open end, and
   f. finger-engageable means projecting axially outwardly of said body for holding said tube against axial movement in a position with said open end facing said ear and adjacent thereto, when said thumb-engaging means on said plunger is engaged by the thumb of such hand for moving said plunger to dispense butter within said tube from said open end and onto the outer surface of said ear.

2. In a device as defined in claim 1;
   g. said tube being cylindrical in cross-sectional contour, and
   h. said finger-engageable means including a flange rigid with said tube spaced from said open end and the portion of said tube adjacent said flange and at the side nearest to said open end being of an outside diameter to be straddled between the middle and forefinger of the hand with said fingers engaging the axially facing side of said flange.

3. In a device as defined in claim 2;
   i. said means on said tube for resisting withdrawal of said plunger from said opposite end being a portion of said tube of slightly restricted diameter providing frictional resistance against accidental withdrawal while permitting withdrawal upon application of a substantial predetermined force and
   j. said thumb-engageable head being of a greater diameter than said cylinder at said opposite end thereof and engageable with the terminal end edges of said tube at said opposite end when said plunger is in a position within said tube approximately at said open end.

4. In a device as defined in claim 3;
   g. said tube being cylindrical in cross-sectional contour,
   h. said finger-engageable means having a radially outwardly facing non-arcuate surface for supporting said tube on its side against rolling.

5. In a device as defined in claim 4;
   i. a second flange on said tube projecting radially outwardly therefrom spaced intermediate said open end of said tube and said first-mentioned flange,
   j. the diameter of said tube between said second flange and said open end being approximately one and one-half inches in diameter and said second flange being approximately one-half inch from said open end to provide a deflector for butter of said body that is outside the dimensions of said open end when said tube is pressed into said body for filling said tube.

6. In combination with the device of claim 1;
   k. a pair of supports adapted to be removably supported in spaced, horizontally-opposed, upwardly extending positions on a stationary horizontal base,
   l. a pair of horizontally elongated spindles respectively extending through and rotatably supported in the upper portion of each support equally spaced above its lower end, each spindle having a finger-engageable handle projecting from one side of the support through which it extends and an ear impaling element projecting horizontally from the other side for horizontal insertion into the end of a horizontally disposed ear of corn, whereby, for a buttering purpose, said ear will be supported on and between said spindles and will be rotated about its longitudinal axis when said spindles are in axial alignment with said elements extending into opposite ends of such ear and one of said handles is manually rotated while said supports are on such base supporting the latter above the base.

* * * * *